(12) United States Patent
Blanchard et al.

(10) Patent No.: US 7,181,423 B2
(45) Date of Patent: Feb. 20, 2007

(54) SYSTEM AND METHOD FOR STOCK OPTIONS MARKET MANAGEMENT

(75) Inventors: Jean-Louis Blanchard, Quincy sous Senat (FR); Stephane Lorin, Paris (FR); Hammou Messatfa, Levallois Perret (FR); Christelle Pavillon, Paris (FR)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 09/863,920

(22) Filed: May 23, 2001

(65) Prior Publication Data
US 2002/0040336 A1 Apr. 4, 2002

(30) Foreign Application Priority Data
May 25, 2000 (EP) .................................. 00480047

(51) Int. Cl.
*G06F 17/60* (2006.01)

(52) U.S. Cl. .............................. 705/36; 705/37; 705/35

(58) Field of Classification Search ................... 705/39, 705/36, 35, 37
See application file for complete search history.

(56) References Cited

U.S. PATENT DOCUMENTS 6,272,474 B1 * 8/2001 Garcia .......................... 705/37
7,043,449 B1 * 5/2006 Li et al. .................... 705/36 R

* cited by examiner

*Primary Examiner*—Vincent Millin
*Assistant Examiner*—Daniel Felten
(74) *Attorney, Agent, or Firm*—Ference & Associates

(57) ABSTRACT

A system and method for analyzing the characteristics of sub-time periods of a time period over which a change of trend of a price evolution of a plurality of stock options occurs is disclosed. The system comprises means for storing data representative of the price evolution of the plurality of stock options and means for aggregating the data associated with each stock option and for creating for each stock option a standard description of the stock option's price for each sub-time period. Each standard description generated is converted into a candlestick pattern being chosen among a predetermined typology of a plurality of candlestick patterns. For each stock option, each standard description of a current sub-time period is also compared to the standard description of a previous sub-time period, and a comparison code chosen among a predetermined typology of a plurality of comparison codes is allocated to each comparison. The system further comprises means for marking each sub-time period of each stock option with a trend indicator using each standard description. The output of the converting means, the output of the comparing means and the output of the marking means are merged within merging means to generate a set of characteristics of the sub-time periods for the plurality of stock options.

14 Claims, 6 Drawing Sheets

SYSTEM AND METHOD FOR STOCK OPTIONS MARKET MANAGEMENT

TECHNICAL FIELD

The present invention relates to the field of stock options market management and more particularly to a method and apparatus for automatically analyzing the change of trend of a stock option's price evolution.

BACKGROUND ART

Recognizing patterns in the financial market is a critical resource for today's trader.

Stock charting is a technique used to further the investor's understanding of dozens of frequently recurring market scenarios. Stock charts are the visual representation of a particular stock or index's price over time. Price is listed on the vertical axis and the time is listed on the horizontal axis. Stock charts may employ mathematical formulas using the historical price data of the stock to generate conclusions about the past price behavior of the stock, and in turn, attempt to anticipate the future price behavior. Stock charts create advantages for technical investors by helping them identify the underlying trend or pattern that is moving the price up or down. Chart patterns illustrate recurring situations that face investors every trading day.

Japanese candlestick charting is one of these techniques used to forecast price behavior. A candlestick chart is a group of candlesticks in chronological order. A candlestick is represented with two parts, the "body" and the "tails" (also called "shadows"). The difference between the open and close prices of a time period makes a box which is call the body. If the body is filled in, the stock price has gone down during that time period, whereby the top of body is the open price and the bottom of the body is the close price. If the body is not filled in, the stock price has gone up during that time period, whereby the bottom of the body is the open and the top of the body is the close. If the stock price did not change, a horizontal line will represent the body. The "tails", or vertical lines, extending from the body indicate the high and low prices during that time period.

For more in-depth coverage on charting techniques, refer to 'Japanese Candlestick Charting Techniques' by Steven Nison.

It is also known to combine the technical indicators of the charting techniques with a technical analysis to enhance the studying of the shape and movement of a stock chart. However, with the existing solutions, generally individuals must use their own professional experience to understand which sequential indicators are characteristic of some events such as a change of trend of the price.

The present invention is directed to a system and method which automatically offers the user such understanding.

SUMMARY OF THE INVENTION

In accordance with the invention, there is provided a method for analyzing the characteristics of sub-time periods of a time period over which a change of trend of price evolution of a plurality of stock options occurs. The method comprises the steps of:
  (a) for each sub-time period, aggregating the data associated with each stock option by creating a standard description of the stock option's price;
  (b) for each sub-time period, converting the standard description of each stock option into a candlestick pattern chosen among a predetermined typology of a plurality of candlestick patterns;
  (c) for each sub-time period and for each stock option, comparing the standard description of the current sub-time period to the standard description of the previous sub-time period, and allocating a comparison code, the comparison code being chosen among a predetermined typology of a plurality of comparison codes;
  (d) using each standard description created in step (a) for marking each sub-time period of each stock option with a trend indicator; and
  (e) applying an exploratory data analysis method to the results obtained in steps (b), (c) and (d) for each stock option to determine a set of characteristics of the sub-time periods for the plurality of stock options.

Also in accordance with the present invention, a system for analyzing the characteristics of sub-time periods of a time period over which a change of trend of a price evolution of a plurality of stock options occurs is disclosed. The system comprises means for storing data representative of the price evolution of the plurality of stock options and means for aggregating the data associated with each stock option and for creating for each stock option a standard description of the stock option's price on each sub-time period. Each standard description generated is converted into a candlestick pattern being chosen among a predetermined typology of a plurality of candlestick patterns. For each stock option, each standard description of a current sub-time period is also compared to the standard description of a previous sub-time period, and a comparison code that is chosen among a predetermined typology of a plurality of comparison codes is allocated to each comparison. The system further comprises means for marking each sub-time period of each stock option with a trend indicator using each standard description. The output of the converting means, the output of the comparing means and the output of the marking means are merged within merging means to generate a set of characteristics of the sub-time periods for the plurality of stock options.

Preferably, the means for generating the set of characteristics further comprise means for operating an exploratory data analysis method.

In an illustrative commercial application, stock options' historical data may be collected at five-minute intervals during one year. The observation's sub-time periods may be a 'one opening day stock exchange'. The stock options prices may be aggregated into a set of four values (the by-day standard description) representing the day open price, the day close price, the day low price and the day high price. After the method is processed according to the aforementioned steps, the characteristic days are highlighted as a begining-up day meaning that a rising price period is starting or as a beginning-down day meaning that a decreasing price period is starting.

DETAILED DESCRIPTION OF THE
INVENTION

Figure 1:
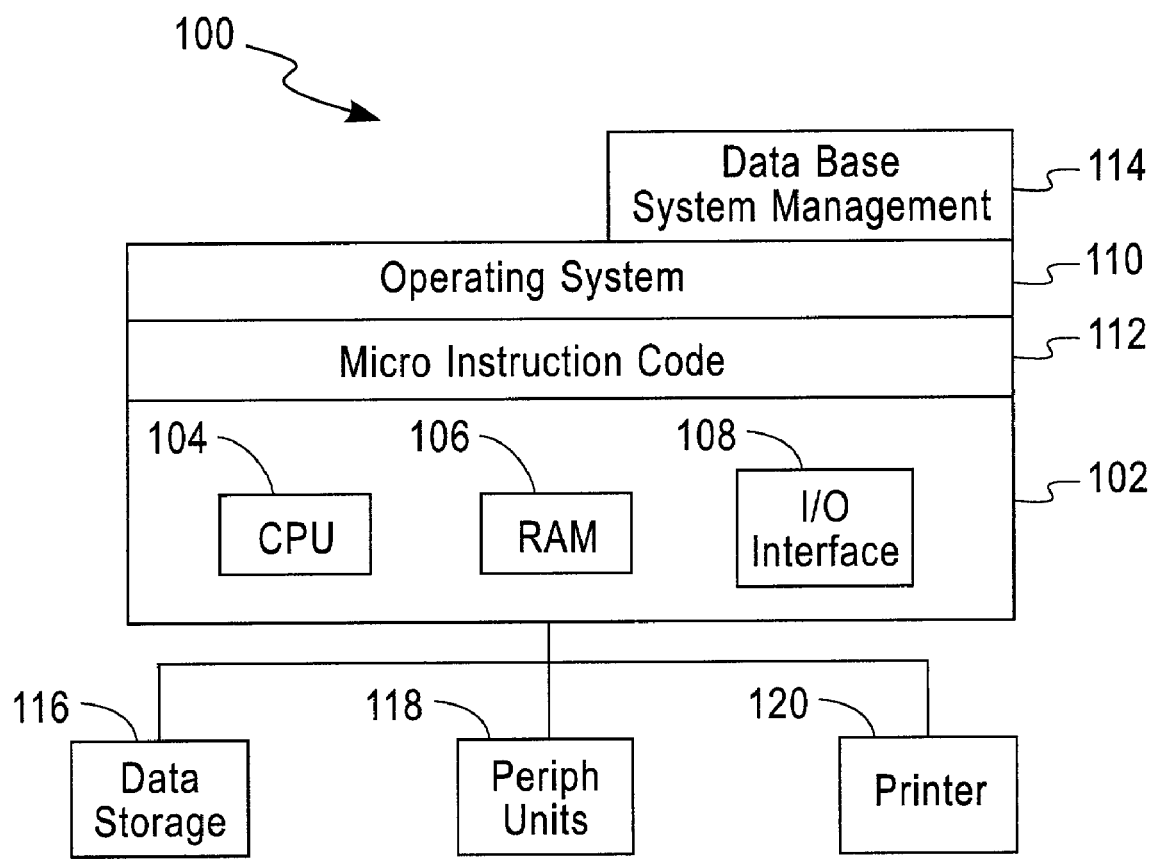
FIG. 1 illustrates a block diagram of a typical digital computer utilized by a preferred embodiment of the invention.

Referring now to the drawings, FIG. 1 illustrates an environment in which a preferred embodiment of the present invention operates. A computer platform 100 includes hardware units 102, including one or more Central Processing Units (CPU) 104, a Random Access Memory (RAM) 106, and an input/output (I/O) interface 108. The computer platform 100 runs with an operating system 110, and may include micro instruction code 112. A data base management system 114 may be part of the micro instruction code 112 or an application program to be executed via the operating system. Historical data may be stored in any kind of local or remote data storage 116. Remote data storage may be accessible through modems and communication lines (not shown). The data may be collected from various sources and media such as written information, experts' evaluations, or in-house historical data. Various peripheral units 118 such as terminals, disks, or scanners may be connected to the computer platform 100 for inputting the data. The computer platform 100 may be a server terminal connected to multiple clients' CPUs. A user or an actor wishing to process the method of the invention may access the system through the I/O interface 108. The I/O interface circuit may be as well a remote terminal with an Internet-like connection. Output results may be available on peripheral units 118 or as one or more data files in the data storage 116 or on a printer device 120.

Figure 2:
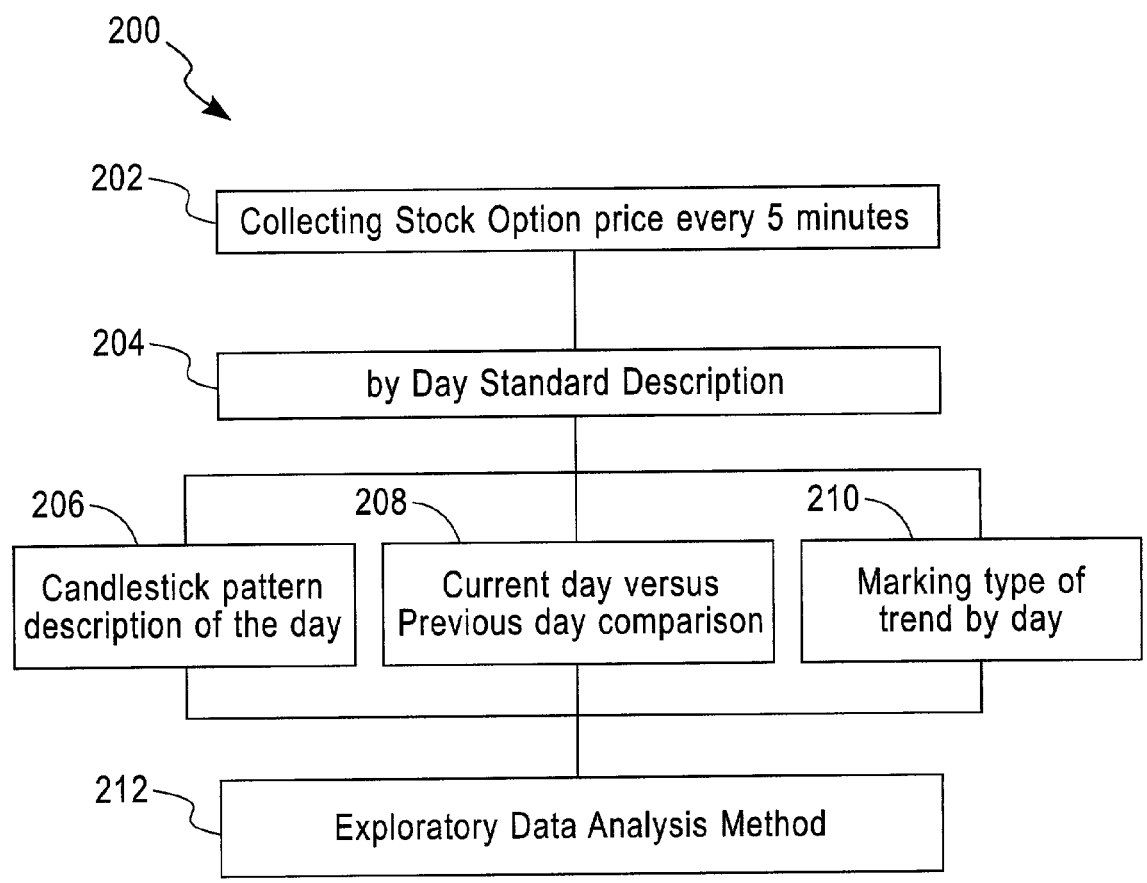
FIG. 2 is a flowchart illustrating the overall operation of a preferred embodiment of the present invention.

Referring to FIG. 2, the overall process 200 of the invention is detailed for a preferred application. For a better understanding of the process, reference is also made to FIG. 3 which is an illustration in the form of database tables of the preferred process.

Figure 3:
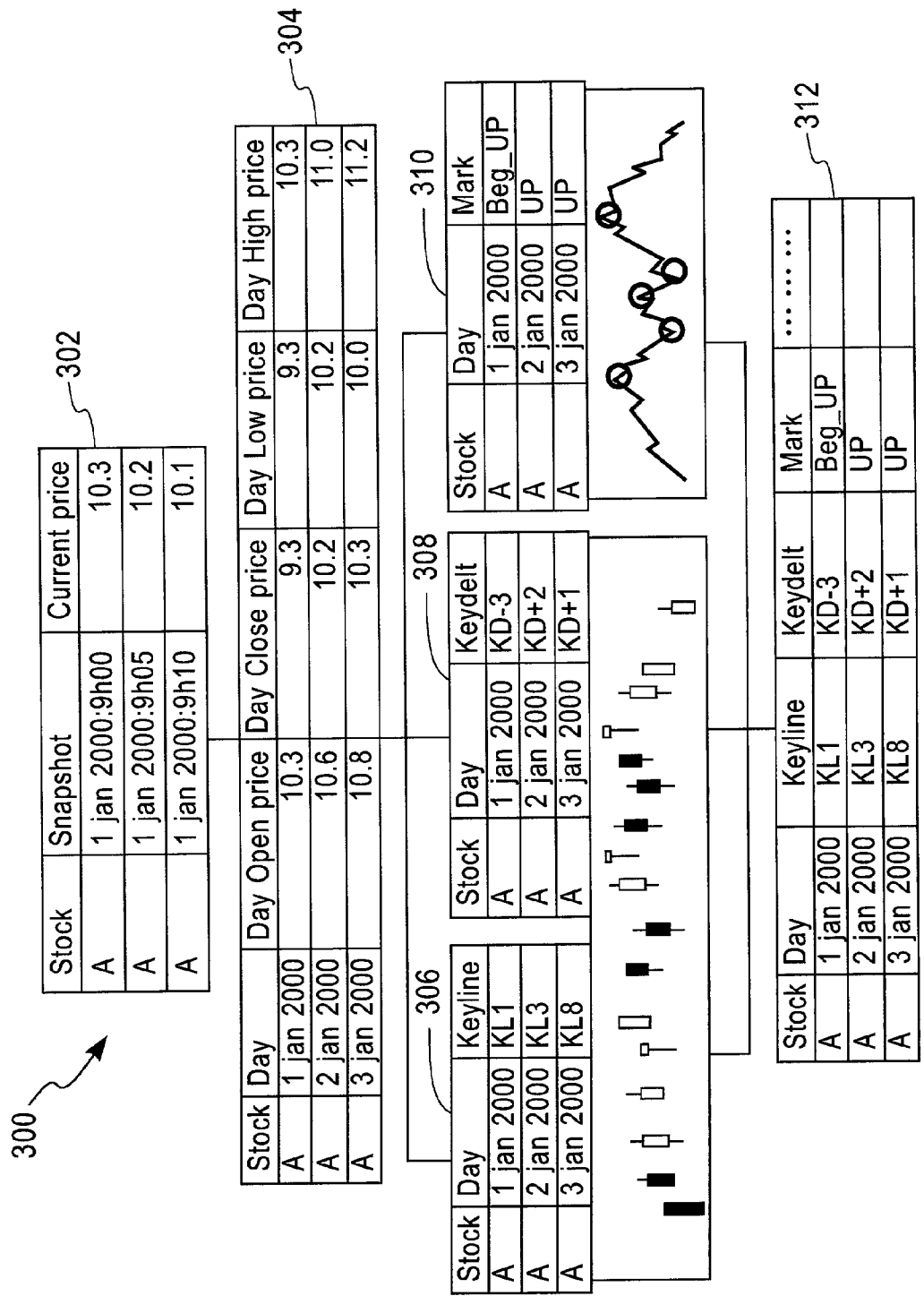
FIG. 3 is a table representation illustrating the process of FIG. 2.

In a first step 202 of FIG. 2 and associated table 302 of FIG. 3, the information relative to a stock option (denoted 'A' in FIG. 3) is collected at regular intervals (column 'snapshot' in FIG. 3). The interval in the present example is 5 minutes. For clarity of the description, the process is described for only one stock option but it will be obvious to those of skill in the art that it applies to a stock option portfolio comprising many stock options.

Preferably the information collected is the stock option price (column 'current price' of FIG. 3) at the current snapshot, although alternatively the data collected may be representative of the evolution of a stock option parameter other than the price of the stock option. The time period for data collection may be sufficiently long to reveal changes of trend in, for example, the price evolution, such as several weeks or months. The present application has been elaborated for a one-year data collection time period.

In step 204, the stock option price is aggregated by day into a standard description which reflects the price variation within the day. The description preferably comprises the values of the open price, the close price, the low price during the day and the high price during the day. It may also includes other values such as the mean price.

Table 304 illustrates the aggregation operation for stock 'A' over 3 days. On the first line containing data in Table 304, the four right columns contain the standard description values for stock 'A' (Day Open Price, Day Close Price, Day Low Price, Day High Price) for a first day (e.g., 1st Jan. 2000). Similarly, on the second line, the standard description values of stock 'A' are stored on the last right columns for a second day (e.g., 2nd Jan. 2000).

Step 206 is the operation which provides the by-day standard description of each stock by a candlestick pattern. As can be seen on table 306, a code 'KL' (denoted 'KeyLine' on the right column of table 306) is attributed to each standard description of stock option 'A'. As it will be fully explained later with reference to FIG. 4, the code 'KL' is chosen from a predetermined candlestick typology including 'well-known' candlestick patterns and specific ones.

The by-day standard description of stock option 'A' for, e.g., Jan. 1st, 2000 is associated with a 'KL1' code which corresponds to the black candlestick pattern illustrated on left side under table 306. The 'KL1' code is a pattern for which the close price is lower than the open price and for which the close price corresponds to the low price and the open price corresponds to the high price.

Similarly, the by-day standard description of stock option 'A' in table 306 for Jan. 2nd, 2000 is associated with a 'KL3' code which corresponds to the second candlestick pattern illustrated on the left side under table 306. The 'KL3' code is a pattern for which the close price is lower than the open price, with the close price equal to the low price, while a high price is higher than the open price (the shaven bottom in the common candlestick terminology).

Finally, third day of stock option 'A' is exemplified with a 'KL8' candlestick code (the white candlestick in the common candlestick terminology).

Step 208 is the operation which provides positioning of the current day standard description of each stock against the previous day standard description. As can be seen in table 308, FIG. 3, a code 'KD' (denoted 'KeyDelt' on the right column of table 308) is attributed to each standard description of stock option 'A'. As it will be fully explained later with reference to FIG. 5, the code 'KD' is chosen from a typology grouping the different relative positions of a current day versus a previous day.

The by-day standard description of stock option 'A' for the Jan. 2nd, 2000 example is associated with a 'KD+2' code which reflects the fact that the average price is significantly higher than the average price of the previous day, Jan. 1st 2000.

Similarly, the by-day standard description of stock option 'A' for the Jan. 3rd, 2000 example is associated with a 'KD+1' code which reflects the fact that the average price is a little bit higher than the average price of the previous day, Jan. 2nd, 2000.

Going to step 210, each by-day standard description of stock 'A' is resumed by a unique value which may be for example computed as being the price average or the half price between open and close prices. The resumed value is useful as will be explained later with reference to FIG. 6 to detect the type of trend of the price evolution for each day.

The third column of table 310, FIG. 3, illustrates the type of trend for stock option 'A' over three days. For example, on Jan. 1st, 2000 the price evolution leads to a 'Beg_UP' mark which points to a beginning of a rising trend for the next days. On the second line, the price evolution of stock option 'A' during Jan. 2nd, 2000 is marked as an 'UP' type evolution.

Next, the indicators created in steps 206, 208 and 210 are operated on in step 212 by a common exploratory data analysis method to obtain a set of characteristics of the different kinds of marks.

The characteristics that issue from step 212 may be available to the user either on a display unit 118 or as a data file 116 or on any output device such as a printer 120.

A person who is skilled in the art will readily understand that according to the analysis method, the characteristics issuing from step 212 may be available from a curve clustering to show which type of curve precedes a 'Beg_Up' or a 'Beg_Down' marked day, or may be available from candlestick associations to determine what groups of candlesticks are present before a 'Beg_Up' or a 'Beg_Down' marked day, or also may be available from other well-known data analysis methods.

Figure 4:
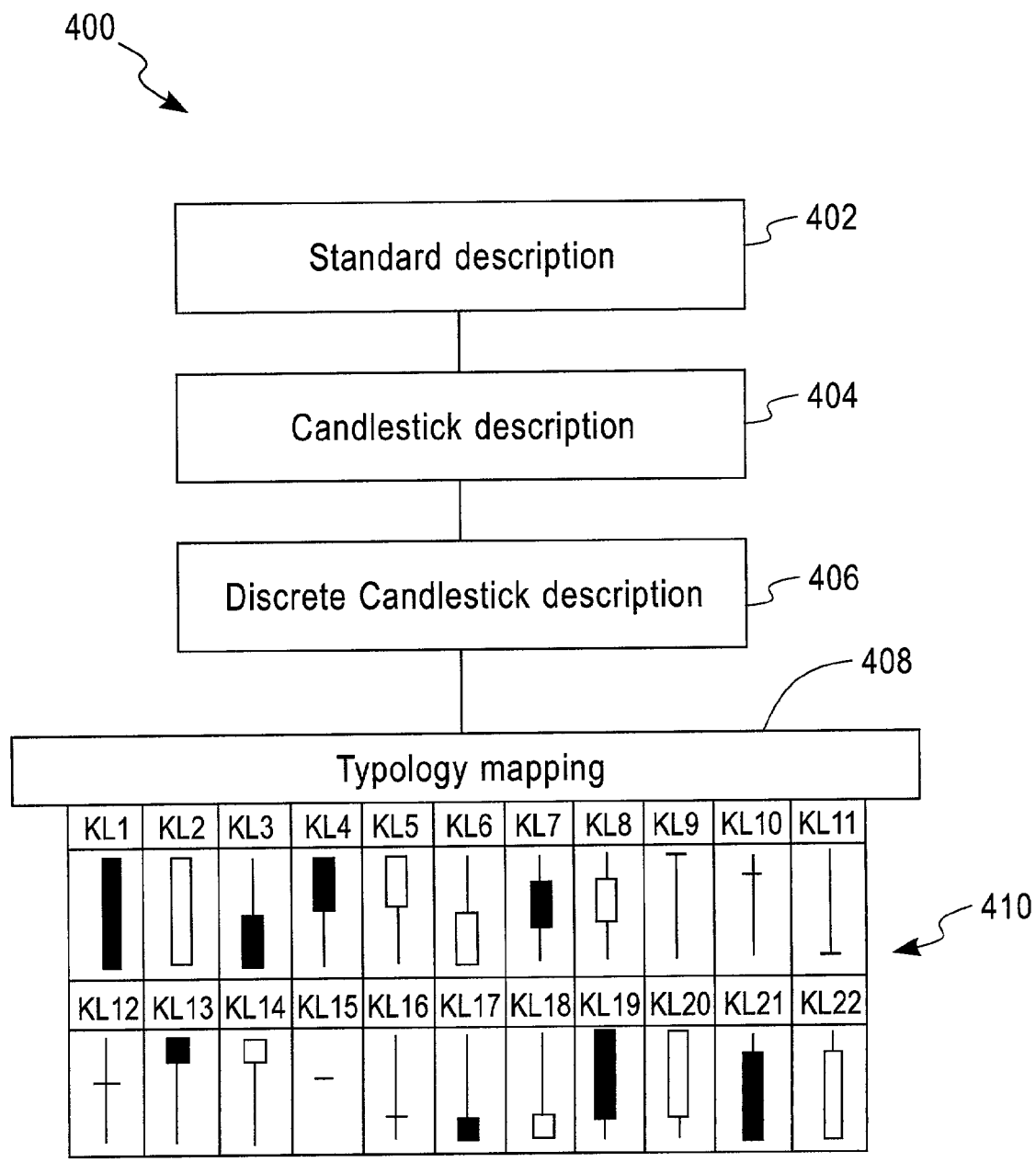
FIG. 4 is a flowchart illustrating the steps for generating the candlestick description.

Referring now to FIG. 4, a detailed flowchart of the process of step 206 is explained. From blocks 402 to 404, the parameters open, close, low and high of the by-day standard description are converted into commonly used elements to construct the candlestick patterns and are generally called 'upper_shadow, lower_shadow, body and type'. The body represents the range between the open and close price. The upper_shadow/lower_shadow represent the high/low price extremes for the day.

The type may be white or black. A white body means that the close price is higher than the open price, while a black body means that the close price is lower than the open price. Thus the relationship between the day's open, high, low, and close price determine the look of the daily candlestick pattern. The body can be long or short and white or black. Shadows can be long or short as well. Thus, the day's price of a stock option may be represented by a specific candlestick pattern. The illustrations below show a white body pattern in left and a black body pattern in right.

Step 408 comprises mapping the finite number of candlestick descriptions to a predetermined candlestick typology 410 wherein each pattern is represented by a keyline code 'KL'.

Figure 5:
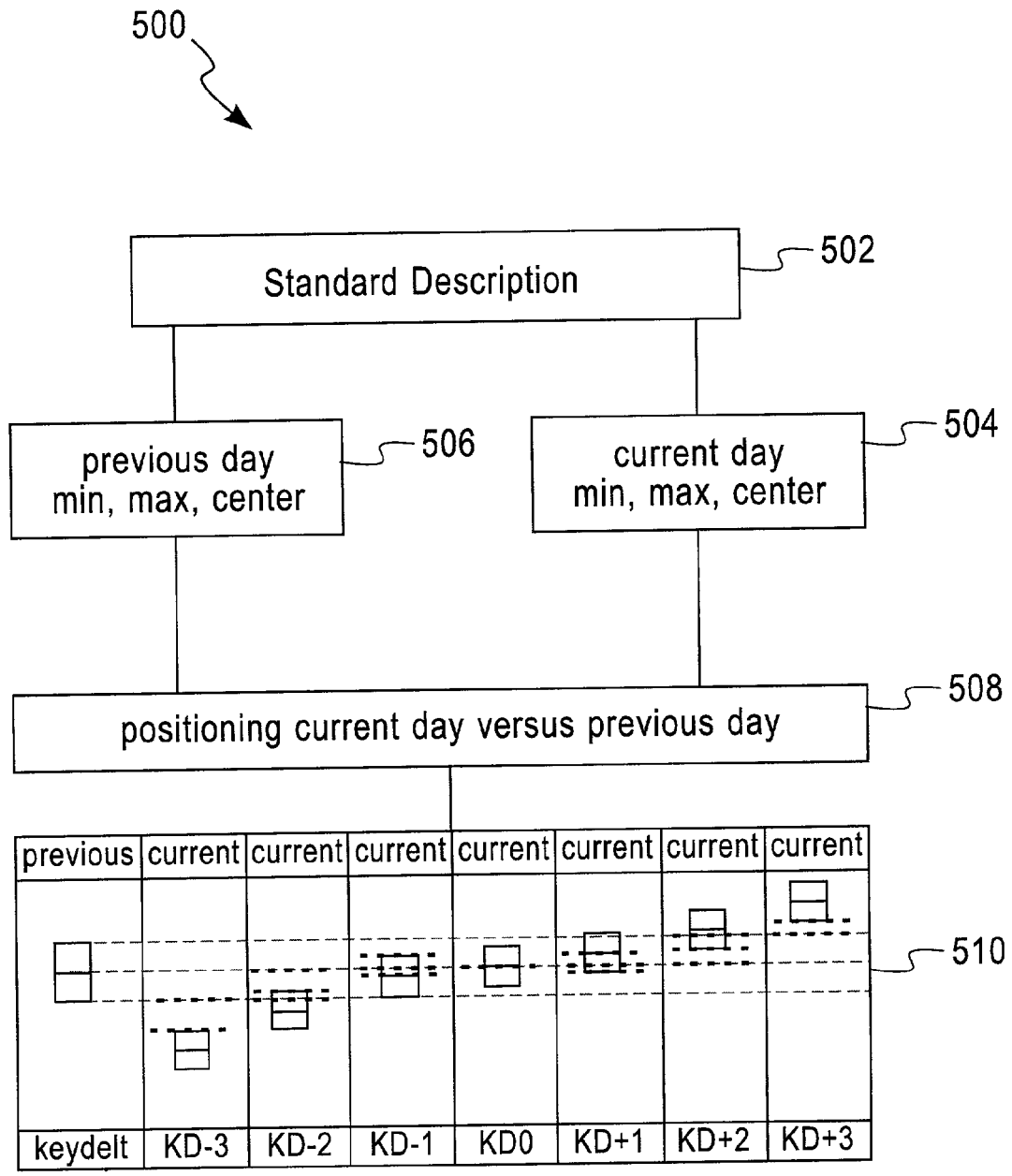
FIG. 5 is a flowchart illustrating the steps for comparing two standard descriptions.

Referring to FIG. 5, starting from the standard description at block 502, characteristic values of the current day's price evolution are computed at step 504 in order to accomplish the positioning operation of step 508. In a preferred embodiment, three values are used. The first is the minimum price 'min' of the open and close price values. The second is the maximum price 'max' of the open and close price values. And the third value is the centre price 'centre' which is halfway between the open and close price values. Obviously, a different number of characteristic values may be used depending on the accuracy required for the positioning typology as illustrated in block 510.

Similar characteristic values are computed for the previous day in step 506. As explained earlier, step 508 compares the current and previous set of characteristic values and maps the comparison to a predetermined comparison typology having keydelt codes 'KD' representing the relative positioning. For example, the 'KD-3' keydelt code is assigned when the maximum of the current day is less than the minimum of the previous day as shown in the second column from the left in block 510.

Figure 6:
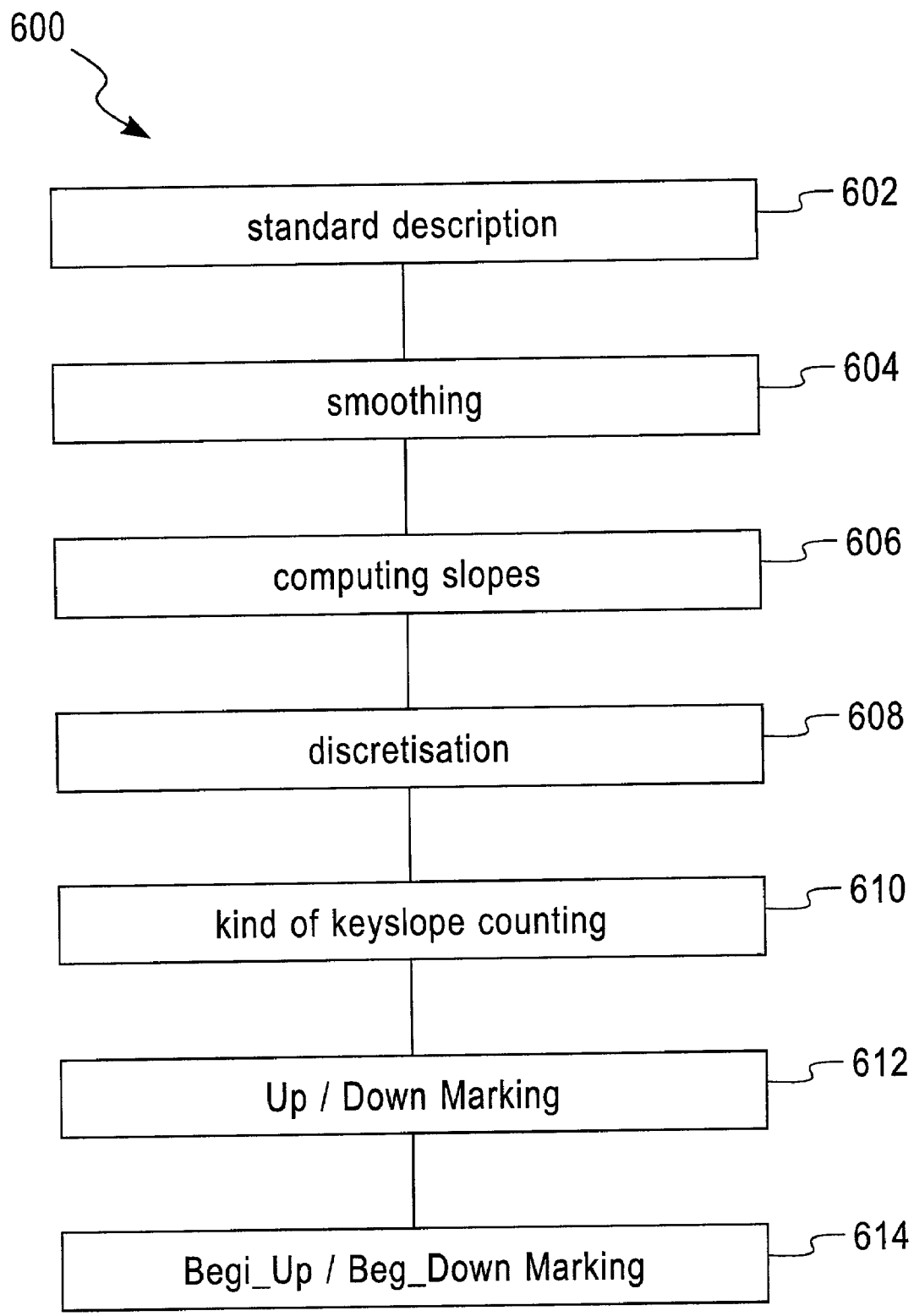
FIG. 6 is a flowchart illustrating the steps of the preferred method to mark the price evolution curve with up an down indicators.

FIG. 6 illustrates one preferred method of marking the price evolution curve with up an down indicators. Starting from the standard description in block 602, one characteristic value of the day's price is computed. This value may be the centre value 'centre' already selected for the process of blocks 504/506, or an average value or a median value or

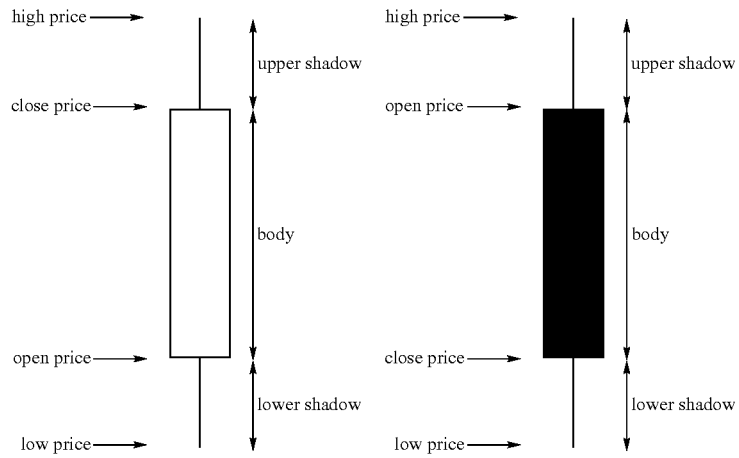

Next at block 406, the body, the upper_shadow and the lower_shadow parameters are discretized. For example, the upper_shadow can be discretized into five values such as a first value when the upper_shadow is in the range of 0 to 5% of the total length of the candlestick (high-low). A second value may correspond to a range of 5 to 45%, a third value for a range of 45 to 55%, a fourth value for a range of 55 to 95% and a fifth value for the range of 95 to 100%. However, this is only an example and any other discretization may be used.

The discretization operation allows reduction of the potentially infinite number of possible candlestick descriptions previously available at step 404 to a finite number.

any other value suitable to be representative of one day's price. Each computed value is smoothed in step 604 regarding the previous and the next day computed values.

In step 606, a difference between the current day's value and the previous day's value is computed which may be expressed as an absolute term or as a relative one.

The differences are discretized in step 608, resulting in a limited number of values called 'key slope' hereinafter representing these differences. In the preferred embodiment, five values are used: the 'high decreasing', the 'medium decreasing', the 'flat', the 'medium increasing' and the 'high increasing'.

In step 610, for each day, the number of each different key slope appearing over a time window of the next days is counted. If a short term view is explored, the window size is preferably seven days, for example, and if a long term view is explored, the window is preferably thirty days. It is to be understood that other day counting may be adapted to count the key slopes such as a simultaneous counting over several time windows.

In step 612, the result of the preceding count is used to mark each day as an 'up' or a 'down' or 'flat' day based on heuristic marking rules. For example, a day is marked as 'up' if in the count of the seven next days there is no decreasing key slope (zero 'high decreasing' and zero 'medium decreasing'), and at least four increasing key slopes (either 'high increasing' or 'medium increasing') including at least one 'high increasing' key slope.

Step 614 determines which days among the marked days are to be marked as being a beginning up 'Beg_up' or beginning down 'Beg_down' day by applying heuristic marking rules in the same way as in previous step 612. For example, a day is marked 'Beg_down' if it is the first day of a marked 'down' series but also if no marked 'down' day appears in the previous seven days.

It will be readily apparent to those of skill in the art that the marking of step 614 may be realised using any other method, such as a regression method.

While the invention has been particularly shown and described with reference to a preferred embodiment thereof, it will be understood by those skilled in the art that various changes in form and details may be made without departing from the spirit and scope of the invention.

The invention claimed is:

1. A method for analyzing the characteristics of sub-time periods of the time period where a change of trend of the price evolution of a plurality of stock options occurs, the method comprising the steps of:
   a. for each sub-time period, aggregating data associated with each stock option by creating a standard description of the stock option's price;
   b. for each sub-time period, converting the standard description of each stock option's price into a candlestick pattern chosen among a predetermined typology of a plurality of candlestick patterns;
   c. for each sub-time period and for each stock option, comparing the standard description of the current sub-time period to the standard description of the previous sub-time period, and allocating a comparison code, the comparison code being chosen among a predetermined typology of a plurality of comparison codes;
   d. using each standard description created in step (a) for marking each sub-time period of each stock option with a trend indicator; and
   e. applying an exploratory data analysis method on the results obtained in steps (b), (c) and (d) for each stock option to determine a set of characteristics of the sub-time periods for the plurality of stock options.

2. The method of claim 1 further comprising a first step before step (a) of collecting data at regular time intervals over the time period.

3. The method of claim 1 wherein the standard description comprises a set of price values (open, close, low, high) describing the price evolution of each stock option within the sub-time period.

4. The method of claim 1 wherein the sub-time period is one day.

5. The method of claim 1 wherein steps (b), (c) and (d) are processed simultaneously.

6. The method of claim 1 wherein step (d) is processed using a regression analysis method.

7. The method of claim 1 wherein step (d) is processed using an image analysis detection method.

8. The method of claim 1 wherein the data collected are representative of the evolution of a stock option parameter other than the stock option's price.

9. A system for analyzing the characteristics of sub-time periods of a time period over which a change of trend of a price evolution of a plurality of stock options occurs, the system comprising:
   means for storing data representative of the price evolution of the plurality of stock options,
   means for aggregating the data associated with each stock option and for creating for each stock option a standard description of the stock option's price for each sub-time period,
   means for converting each standard description into a candlestick pattern being chosen among a predetermined typology of a plurality of candlestick patterns,
   means for comparing the standard description of each stock option over a current sub-time period to the standard description of the respective stock option over the previous sub-time period, and allocating a comparison code, the comparison code being chosen among a predetermined typology of a plurality of comparison codes,
   means for marking each sub-time period with a trend indicator using the standard description of each stock option, and
   means for merging the output of the converting means, the output of the comparing means and the output marking means, to generate a set of characteristics of the sub-time periods for the plurality of stock options.

10. A system according to claim 9 wherein the means for generating the set of characteristics further comprise means for operating an exploratory data analysis method.

11. A system according to claim 9 further comprising means for collecting the data representative of the price evolution of the plurality of stock options at regular time intervals over the time period.

12. The system according to claim 9 further comprising means for simultaneously operating the converting means, the comparing means and the marking means.

13. The system according to claims 9 wherein the data collected are representative of the evolution of a stock option parameter other than the stock option's price.

14. A program storage device readable by machine, tangibly embodying a program of instructions executable by the machine to perform method steps for automatically analyzing characteristics of sub-time periods of the time period in which a change of trend of price evolution of a plurality of stock options occurs, the method comprising the steps of:
   a. for each sub-time period, aggregating data associated with each stock option by creating a standard description of the stock option's price;
   b. for each sub-time period, converting the standard description of each stock option's price into a candlestick pattern chosen among a predetermined rypology of a plurality of candlestick patterns;
   c. for each sub-time period and for each stock option, comparing die standard description of the current sub-time period to the standard description of the previous sub-time period, and allocating a comparison code, the comparison code being chosen among a predetermined typology of a plurality of comparison codes;

d. using each standard description created in step (a) for marking each sub-time period of each stock option with a trend indicator; and
e. applying an exploratory data analysis method on the results obtained on steps (b), (c) and (d) for each stock option to determine a set of characteristics of the sub-time periods for the plurality of stock options.

* * * * *

UNITED STATES PATENT AND TRADEMARK OFFICE
CERTIFICATE OF CORRECTION

PATENT NO.       : 7,181,423 B2
APPLICATION NO.  : 09/863920
DATED            : February 20, 2007
INVENTOR(S)      : Blanchard et al.

It is certified that error appears in the above-identified patent and that said Letters Patent is hereby corrected as shown below:

Column 8, Line 60, "rypology" should be --typology--

Column 8, Line 63, "die" should be --the--

Signed and Sealed this

Eighth Day of May, 2007

JON W. DUDAS
*Director of the United States Patent and Trademark Office*